US011748006B1

(12) United States Patent
Israni et al.

(10) Patent No.: US 11,748,006 B1
(45) Date of Patent: *Sep. 5, 2023

(54) MOUNT PATH MANAGEMENT FOR VIRTUAL STORAGE VOLUMES IN A CONTAINERIZED STORAGE ENVIRONMENT

(71) Applicant: Portworx, Inc., Redwood City, CA (US)

(72) Inventors: Dinesh Israni, San Jose, CA (US); Harsh Desai, San Jose, CA (US); Goutham Rao, Santa Clara, CA (US); Vinod Jayaraman, San Francisco, CA (US)

(73) Assignee: Pure Storage, Inc., Santa Clara, CA (US)

( * ) Notice: Subject to any disclaimer, the term of this patent is extended or adjusted under 35 U.S.C. 154(b) by 115 days.

This patent is subject to a terminal disclaimer.

(21) Appl. No.: 17/223,972

(22) Filed: Apr. 6, 2021

Related U.S. Application Data (63) Continuation of application No. 15/994,403, filed on May 31, 2018, now Pat. No. 11,003,372.

(51) Int. Cl.
*G06F 3/06* (2006.01)
*G06F 9/455* (2018.01)

(52) U.S. Cl.
CPC .......... *G06F 3/0635* (2013.01); *G06F 3/0607* (2013.01); *G06F 3/067* (2013.01); *G06F 3/0631* (2013.01); *G06F 3/0632* (2013.01); *G06F 3/0637* (2013.01); *G06F 3/0665* (2013.01); *G06F 9/45558* (2013.01); *G06F 2009/45583* (2013.01)

(58) Field of Classification Search
CPC .... G06F 3/0635; G06F 3/0607; G06F 3/0631; G06F 3/0632; G06F 3/0637; G06F 3/0665; G06F 3/067; G06F 2009/45583
See application file for complete search history.

(56) References Cited

U.S. PATENT DOCUMENTS

| | | | |
|---|---|---|---|
| 5,742,792 A | 4/1998 | Yanai et al. | |
| 5,758,334 A | 5/1998 | Knight, III | |
| 6,591,376 B1 * | 7/2003 | VanRooven | ........ G06F 11/1417 714/36 |
| 7,131,027 B2 | 10/2006 | Kodama | |
| 7,155,460 B2 * | 12/2006 | McGovern | ............ G06F 16/181 |
| 7,191,284 B1 | 3/2007 | Gupta | |
| 7,287,045 B2 | 10/2007 | Saikaa et al. | |
| 7,290,168 B1 | 10/2007 | Dekoning | |
| 7,552,223 B1 | 6/2009 | Ackaouy | |
| 7,689,759 B2 | 3/2010 | Bello et al. | |
| 7,743,206 B2 | 6/2010 | Kishi et al. | |

(Continued)

*Primary Examiner* — Prasith Thammavong
(74) *Attorney, Agent, or Firm* — ALG Intellectual Property, LLC (57) ABSTRACT

An illustrative method includes determining whether a virtual storage volume is successfully mounted to a mount path associated with a compute node, the mount path being marked as read-only, marking, if the determining includes determining that the virtual storage volume is successfully mounted to the mount path, the mount path as writable, and maintaining, if the determining includes determining that the virtual storage volume is unsuccessfully mounted to the mount path, the mount path as read-only.

20 Claims, 5 Drawing Sheets

(56) References Cited

U.S. PATENT DOCUMENTS

| | | |
|---|---|---|
| 7,810,092 B1 | 10/2010 | Van Rietschote |
| 7,840,730 B2 | 11/2010 | D'Amato et al. |
| 7,873,619 B1 * | 1/2011 | Faibish .................. G06F 16/13 |
| | | 707/823 |
| 7,953,948 B1 | 5/2011 | Dyatlov et al. |
| 8,312,231 B1 | 11/2012 | Li et al. |
| 8,392,370 B1 | 3/2013 | Whitney |
| 8,468,174 B1 | 6/2013 | Yueh et al. |
| 8,504,797 B2 | 8/2013 | Mimatsu |
| 8,527,697 B2 | 9/2013 | Jeong et al. |
| 8,589,550 B1 | 11/2013 | Faibiish |
| 8,595,430 B2 | 11/2013 | Iwasaki et al. |
| 8,595,549 B2 | 11/2013 | Ninose |
| 8,612,674 B2 | 12/2013 | Asher et al. |
| 8,650,359 B2 | 2/2014 | Vaghani et al. |
| 8,650,566 B2 | 2/2014 | Vaghani et al. |
| 8,683,152 B2 | 3/2014 | Kulkarni et al. |
| 8,719,767 B2 | 5/2014 | Bansod |
| 8,756,373 B2 | 6/2014 | Jeong et al. |
| 8,782,163 B2 | 7/2014 | Melnikov |
| 8,799,903 B1 | 8/2014 | Talwar |
| 9,021,163 B1 | 4/2015 | Czarny et al. |
| 9,032,150 B2 | 5/2015 | Okamoto et al. |
| 9,043,571 B2 | 5/2015 | Matsuya et al. |
| 9,239,680 B2 | 1/2016 | Eguchi |
| 9,256,635 B2 | 2/2016 | Czarny et al. |
| 9,292,211 B2 | 3/2016 | Saito et al. |
| 9,336,149 B2 | 5/2016 | Bish et al. |
| 9,430,212 B2 | 8/2016 | Tripoli et al. |
| 9,448,943 B2 | 9/2016 | Bish et al. |
| 9,626,110 B2 | 4/2017 | Sakata et al. |
| 9,639,385 B2 | 5/2017 | Conover |
| 9,766,825 B2 | 9/2017 | Bhagi et al. |
| 9,946,569 B1 | 4/2018 | Beedu et al. |
| 9,977,616 B2 | 5/2018 | Takeuchi et al. |
| 10,101,913 B2 | 10/2018 | Kochunni et al. |
| 10,114,705 B1 | 10/2018 | Kumar et al. |
| 10,168,929 B2 | 1/2019 | Bhagi et al. |
| 10,169,348 B2 | 1/2019 | Shankar et al. |
| 10,216,433 B2 | 2/2019 | Don et al. |
| 10,318,157 B2 | 6/2019 | Kochunni et al. |
| 10,360,009 B2 | 7/2019 | Holman et al. |
| 10,380,356 B2 | 8/2019 | Yan |
| 10,503,441 B2 | 12/2019 | Israni et al. |
| 2002/0016792 A1 * | 2/2002 | Ito ........................... G06F 16/10 |
| 2003/0126200 A1 | 7/2003 | Wolff |
| 2004/0054748 A1 | 3/2004 | Ackaouy |
| 2006/0010341 A1 | 1/2006 | Kodama |
| 2006/0242381 A1 | 10/2006 | Shatskih et al. |
| 2008/0046610 A1 | 2/2008 | Tripathi et al. |
| 2008/0294698 A1 | 11/2008 | Fujimoto et al. |
| 2009/0006863 A1 | 1/2009 | Mizuno |
| 2009/0063748 A1 | 3/2009 | Bello et al. |
| 2009/0327798 A1 | 12/2009 | D'Amato et al. |
| 2010/0077160 A1 | 3/2010 | Liu et al. |
| 2011/0107023 A1 | 5/2011 | Mccallister et al. |
| 2011/0131185 A1 * | 6/2011 | Kirshenbaum ...... G06F 11/1448 |
| | | 711/E12.001 |
| 2011/0145494 A1 | 6/2011 | Mitsuma et al. |
| 2011/0276754 A1 | 11/2011 | Bish et al. |
| 2012/0084499 A1 | 4/2012 | Iwasaki et al. |
| 2012/0144107 A1 | 6/2012 | Asher et al. |
| 2012/0174096 A1 | 7/2012 | Conover |
| 2012/0191683 A1 | 7/2012 | Tanaka et al. |
| 2012/0226860 A1 | 9/2012 | Saito et al. |
| 2012/0254824 A1 | 10/2012 | Bansod |
| 2012/0296960 A1 | 11/2012 | Kreuzer et al. |
| 2012/0311263 A1 | 12/2012 | Kamath et al. |
| 2012/0311271 A1 | 12/2012 | Klein et al. |
| 2013/0054889 A1 | 2/2013 | Vaghani et al. |
| 2013/0055249 A1 | 2/2013 | Vaghani et al. |
| 2013/0132767 A1 | 5/2013 | Ninose |
| 2013/0318309 A1 | 11/2013 | Jeong et al. |
| 2013/0325915 A1 * | 12/2013 | Ukai ..................... G06F 16/182 |
| | | 707/827 |
| 2014/0075143 A1 | 3/2014 | Matsuya et al. |
| 2014/0201313 A1 | 7/2014 | Melnikkov |
| 2014/0222879 A1 | 8/2014 | Ricker et al. |
| 2014/0372381 A1 | 12/2014 | Sorenson, III et al. |
| 2015/0227355 A1 | 8/2015 | Tripoli et al. |
| 2015/0248245 A1 | 9/2015 | Sakata et al. |
| 2015/0278046 A1 | 10/2015 | Zellermayer |
| 2015/0293938 A1 | 10/2015 | Hittle |
| 2015/0302045 A1 | 10/2015 | Czarny et al. |
| 2016/0011794 A1 | 1/2016 | Bish et al. |
| 2016/0062694 A1 | 3/2016 | Makkar |
| 2016/0259590 A1 * | 9/2016 | Yoshida ................ G06F 3/0641 |
| 2016/0359981 A1 | 12/2016 | Ulatoski |
| 2017/0024152 A1 | 1/2017 | Bhagi et al. |
| 2017/0060431 A1 | 3/2017 | Kochunni et al. |
| 2018/0018135 A1 | 1/2018 | Shen |
| 2018/0039652 A1 | 2/2018 | Nichols |
| 2018/0129435 A1 | 5/2018 | Bhagi et al. |
| 2018/0150341 A1 | 5/2018 | Pan |
| 2018/0267785 A1 | 9/2018 | Holman et al. |
| 2018/0336079 A1 | 11/2018 | Soman |
| 2018/0349032 A1 | 12/2018 | Kochunni et al. |
| 2019/0065096 A1 | 2/2019 | Sterin |
| 2019/0087108 A1 | 3/2019 | Bhagi et al. |
| 2019/0129743 A1 | 5/2019 | Zheng et al. |
| 2019/0155548 A1 | 5/2019 | Jia et al. |
| 2019/0163405 A1 | 5/2019 | Israni et al. |
| 2019/0235900 A1 | 8/2019 | Singh et al. |
| 2019/0250828 A1 | 8/2019 | Kochunni et al. |
| 2019/0266022 A1 | 8/2019 | Israni et al. |
| 2019/0369895 A1 | 12/2019 | Israni et al. |
| 2020/0081623 A1 | 3/2020 | Jayaraman et al. |

\* cited by examiner

MOUNT PATH MANAGEMENT FOR VIRTUAL STORAGE VOLUMES IN A CONTAINERIZED STORAGE ENVIRONMENT

RELATED APPLICATIONS

The present application is a continuation application of U.S. patent application Ser. No. 15/994,403, filed May 31, 2018, the contents of which are hereby incorporated by reference in their entirety.

TECHNICAL FIELD

The present disclosure relates generally to containerized applications and more specifically to containerized scalable storage applications.

DESCRIPTION OF RELATED ART

When deploying applications in the cloud, both the hardware and software of the underlying computing device may vary considerably between different environments and different machines. Accordingly, one of the most difficult challenges facing software developers is interoperability of software between different computing environments. Software written to run in one operating system typically will not run without modification in a different operating system. Even within the same operating system, a program may rely on other programs in order to function. Each of these dependencies may or may not be available on any given system, or may be available but in a version different from the version originally relied upon. Thus, dependency relationships further complicate efforts to create software capable of running in different environments.

In recent years, the introduction of operating-system-level virtualization has facilitated the development of containerized software applications. A system configured with operating-system-level virtualization includes a container engine that operates on top of the operating system. Importantly, the container engine is configured to operate interchangeably in different environments (e.g., with different operating systems). At the same time, the container engine is configured to present a standardized interface to one or more software containers.

Each software container may include computer programming code for performing one or more tasks. Examples of software containers include web servers, email servers, web applications, and other such programs. Each software container may include some or all of the software resources that the software in the container needs in order to function. For example, if a software container includes a web application written in the Python programming language, the software container may also include the Python programming language modules that the web application relies upon. In this way, the software container may be installed and may execute successfully in different computing environments as long as the environment includes a container engine. One example of a containerized software application is a containerized software-assisted storage environment.

SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Various embodiments of the present invention relate generally to devices, systems, and methods for protecting volume namespaces from corruption in a distributed container orchestrator. According to various embodiments, a designated mount path may be created at a designated compute node. The designated mount path may be associated with a virtual storage volume. The designated compute node may be implemented on a computing device that includes a processor, a memory module, and a communications interface. The designated mount path may be marked as read-only, and an instruction may be issued to mount the virtual storage volume into the designated mount path. A request to write data to the storage volume, where the write request identifies the designated mount point.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular containerized storage environments. However, it should be noted that the techniques of the present invention apply to a wide variety of different containerized storage environments. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity.

However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, a container orchestrator may communicate with a scheduler agent on a compute node to mount and/or unmount a virtual storage volume at the compute node. The scheduler agent may perform operations such as creating and/or deleting a mount path, mounting and/or unmounting the virtual storage volume, and/or marking the mount path as writable and/or read-only in order to eliminate cross-node race conditions.

EXAMPLE EMBODIMENTS

Techniques and mechanisms described herein facilitate the operation of a distributed, containerized storage system. In a containerized application system based on technology such as Docker or Kubernetes, each compute node implements a container layer that runs in an operating system. The container layer acts as an intermediate layer to facilitate the execution of one or more container applications. The container system is standardized so that a container application may be instantiated on any of various operating systems and on any of various types of hardware.

According to various embodiments, a scheduler (otherwise known as an orchestrator) on a master node may control the assignment of volumes to nodes in a distributed storage system. For example, the scheduler may receive instructions to load a container at each of a set of compute nodes and to mount one or more storage volumes at one or more of the compute nodes. To accomplish this task, the scheduler may communicate with a scheduler agent at each of the compute nodes. This communication may include instructions about which container or containers to initiate and/or which storage volume or volumes to mount and/or unmount. Techniques and mechanisms reflective of a system configuration that includes a master node in communication with a number of compute nodes are discussed in further detail with respect to FIG. 1.

In some embodiments, each compute node may include a storage driver configured to facilitate access between applications loaded on the compute node and one or more storage volumes mounted on the compute node. The storage driver may be implemented as a containerized application having special permissions beyond those typically accorded to containerized applications in the system, a configuration referred to herein as a privileged storage container. Techniques and mechanisms related to privileged storage containers are discussed in further detail with respect to FIG. 2.

In particular embodiments, a storage volume mounted in a distributed storage system may be managed by either the entity controlling the privileged storage container or by an external provider. Conventional container orchestrators do not protect against some race conditions when mounting and using volumes managed by external providers. For example, when starting a container, the container orchestrator is communicating with both the storage driver and container driver in a distributed cluster. Since the container orchestrator cannot perform atomic operations across these drivers, conditions can arise in the cluster where the container driver is using one or more invalid storage namespaces to run applications. Such conditions can lead to corrupt namespaces and/or situations where data is actually not being persisted correctly in a distributed cluster.

In a conventional distributed storage system, a container orchestrator may send a Mount( ) command to the storage driver on a storage node (N1) to mount a virtual storage volume at a designated mount path for the use of a container application. Then, the container orchestrator may instruct the container driver at the storage node (N1) to start the container application and use the mount path for storage by the container application. It is possible that before the container driver issues an rbind (so that it can use the path from within the container application) on a node (N1) for the designated mount path, another node (N2) could request the device be unmounted and detached. For example, such a race condition is possible if multiple containers on different nodes (N1 and N2) are trying to use the same virtual storage volume. Since no process is using the virtual storage volume when the detach request is received, the detach would succeed on node N1. This would cause container driver to rbind an empty local directory into the container on node N1 and cause writes to be made to a storage location other than the virtual storage volume, which is not what the application would expect. Instead, the virtual storage volume would be attached to node N2.

Figure 3:
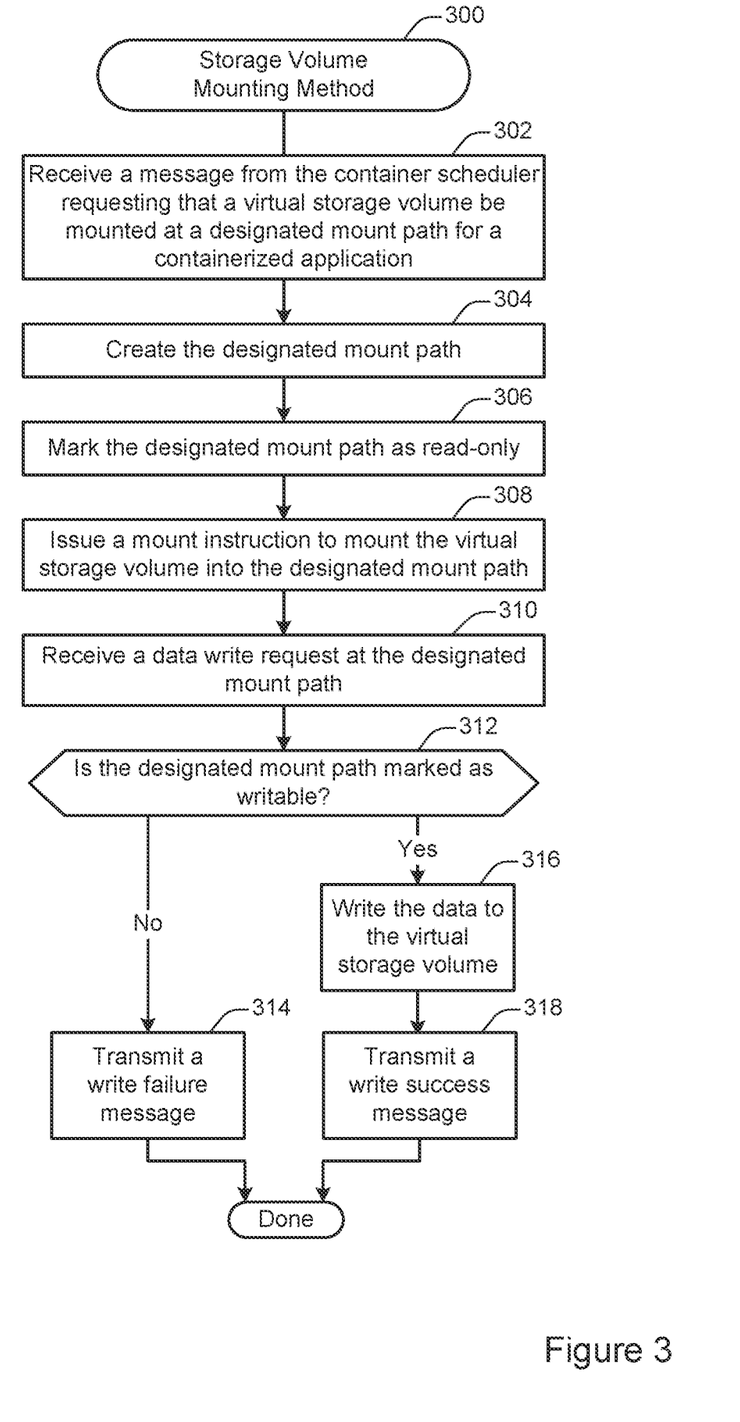
FIG. 3 illustrates an example of a method for mounting a storage volume, performed in accordance with one or more embodiments.
Figure 4:
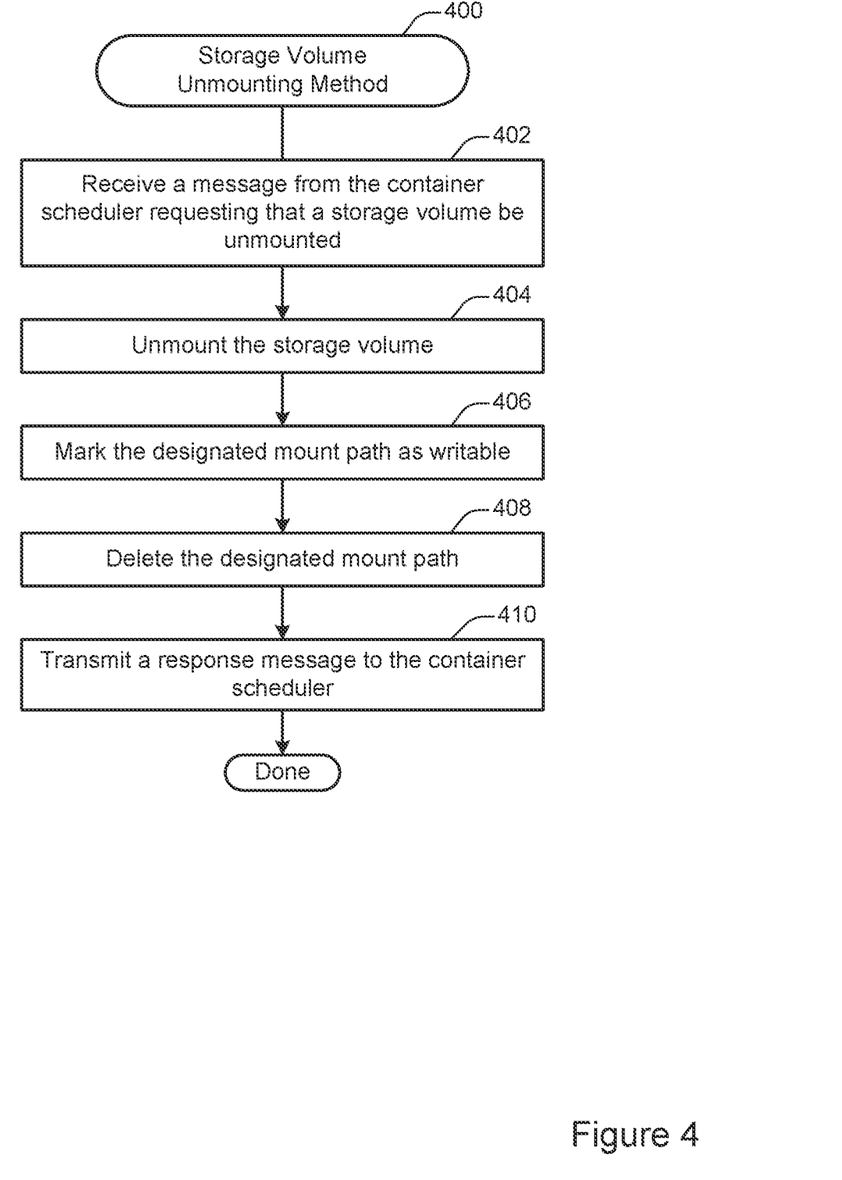
FIG. 4 illustrates an example of a method for unmounting a storage volume, performed in accordance with one or more embodiments.

According to various embodiments, techniques and mechanisms described herein may facilitate the eliminate of such race conditions. For example, FIG. 3 illustrates a method 300 for mounting a storage volume on a container node, whereas FIG. 4 illustrates a method 400 for unmounting a storage volume from a container node.

In many configurations, potentially many instances of a container application are created on potentially many different nodes. A clustered storage solution can be employed to provide access to data. In a clustered storage solution, a virtual storage volume can be created. Such a virtual storage volume can span potentially many different physical disks and can be made accessible to any of the nodes.

According to various embodiments, a set of nodes may be initialized to provide an array of software services such as web applications supported by databases and web servers. Because many of these applications rely on reading or writing data to and from storage devices, a storage driver may be used to attach virtual volumes to nodes to provide access to storage.

According to various embodiments, a containerized application system in which software services are provided by application instances implemented across multiple nodes provides several advantages, such as scalability and dependency management. However, such a configuration creates substantial performance challenges. For example, if a database is implemented on one node while the storage volume used to manage data accessed by the database is mounted on another node, then performance may degrade significantly because every database read or write may require inter-node communication.

In some embodiments, storage containers may communicate directly with server resources such as hardware storage devices, thus reducing or eliminating unnecessary virtualization overhead. Storage containers may be configured for implementation in a variety of environments, including both local computing environments and cloud computing environments. In some implementations, storage volumes created according to the techniques and mechanisms described herein may be highly failure-tolerant. For example, a virtual storage volume may include data stored on potentially many different storage nodes. A storage node may fail for any of various reasons, such as hardware failure, network failure, software failure, or server maintenance. Data integrity may be maintained even if one or more nodes that make up a storage volume fail during data storage operations.

According to various embodiments, a storage system with components located across different computing devices is referred to herein as a "distributed storage system." Alternately, or additionally, such a storage system may be referred to herein as a "clustered storage system."

Figure 1:
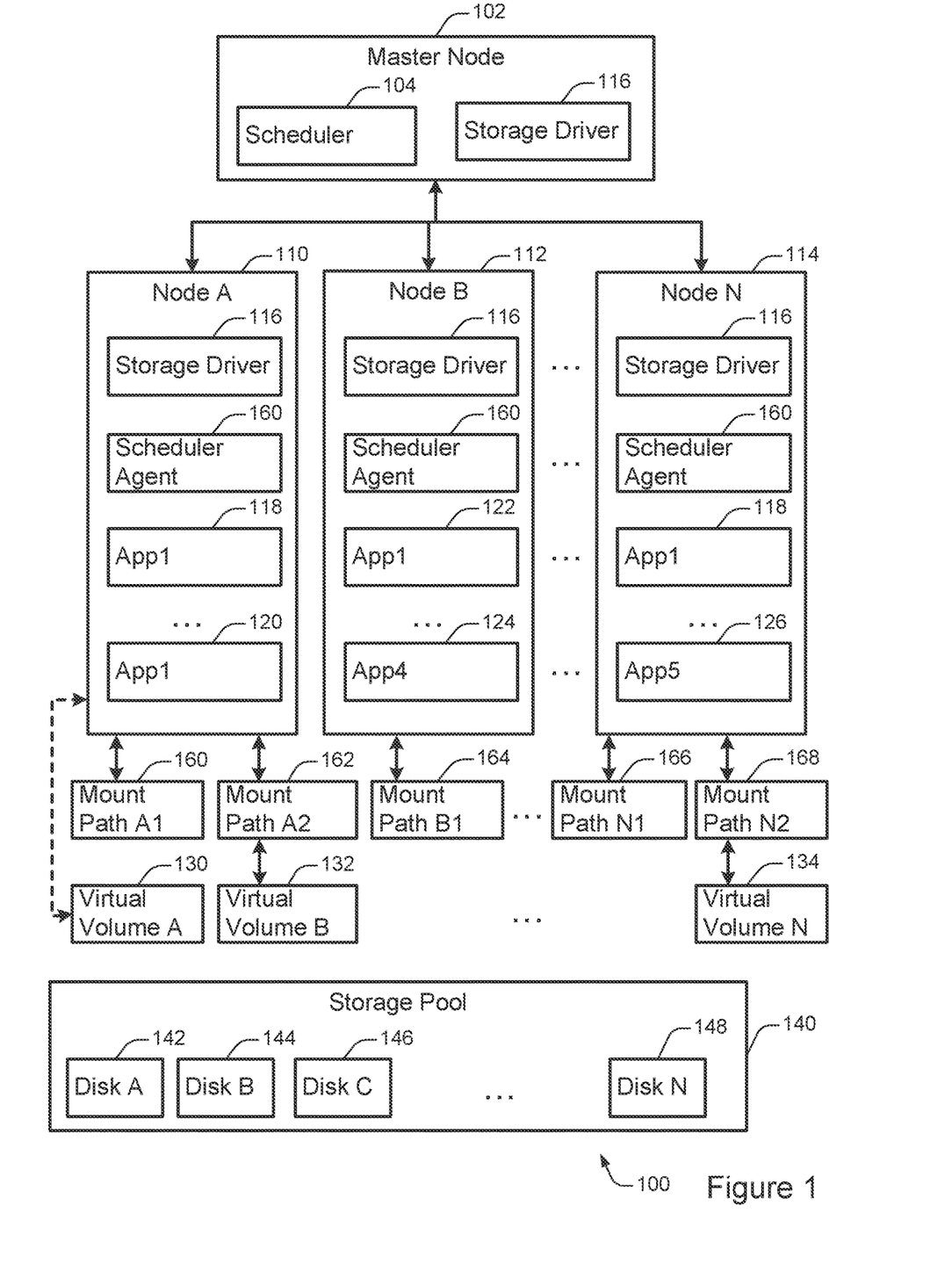
FIG. 1 illustrates an example of an arrangement of components in a containerized storage system, configured in accordance with one or more embodiments.

FIG. 1 illustrates an example of an arrangement of components in a containerized storage system 100, configured in accordance with one or more embodiments. The storage system 100 includes a master node 102 in communication with a plurality of application nodes 110, 112, and 114. Each node has implemented thereon a storage driver 116, In addition, the master node includes a scheduler 104. Each node can mount one or more of a plurality of virtual volumes 130, 132, and 134. Each virtual volume can include storage space on one or more of a plurality of storage disks 142, 144, 146, and 148 in a storage pool 140. Each node can create one or more mount paths, such as the mount paths 160, 162, 164, 166, and 168.

According to various embodiments, the clustered storage system 100 shown in FIG. 1 may be implemented in any of various physical computing contexts. For example, some or all of the components shown in FIG. 1 may be implemented in a cloud computing environment such as Amazon Web Services (AWS), Microsoft Azure, or Google Cloud. As another example, some or all of the components shown in FIG. 1 may be implemented in a local computing environment such as on nodes in communication via a local area network (LAN) or other privately managed network.

Figure 5:
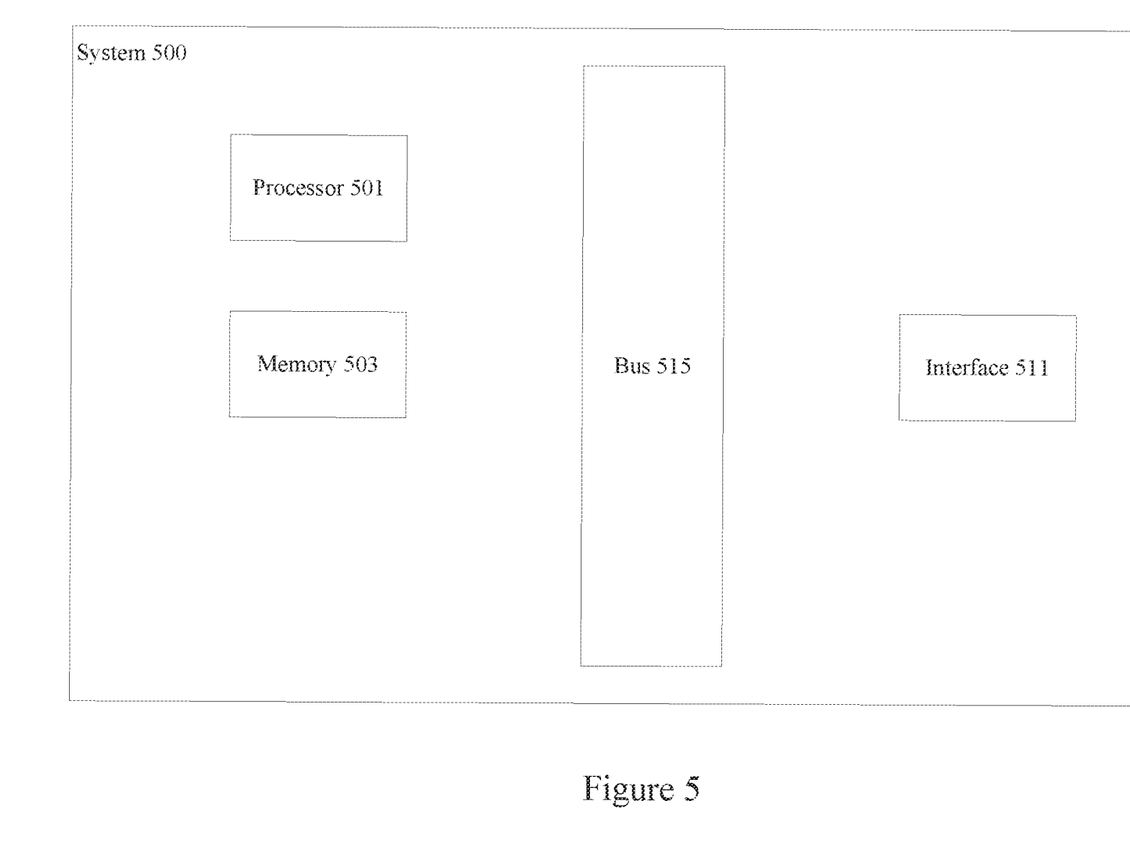
FIG. 5 illustrates an example of a server, configured in accordance with one or more embodiments.

In some implementations, a node is an instance of a container system implemented on a computing device such as the computing device shown in FIG. 5. In some configurations, multiple nodes may be implemented on the same physical computing device. Alternately, a computing device may contain a single node. An example configuration of a container node is discussed in further detail with respect to FIG. 2.

According to various embodiments, each node may be configured to instantiate and execute one or more containerized application instance. Each node may include many components not shown in FIG. 1. These components may include hardware and/or software components, such as those discussed with respect to FIG. 2 and FIG. 5.

According to various embodiments, each node may include a storage driver 116. The storage driver 116 may perform any of various types of storage-related operations for the node. For example, the storage driver 116 may facilitate the mounting or unmounting of virtual storage volumes. As another example, the storage driver 116 may facilitate data storage or retrieval requests associated with a mounted virtual storage volume. In some embodiments, the storage driver 116 may be substantially similar or identical to the privileged storage container 216 shown in FIG. 2.

According to various embodiments, each node may include a scheduler agent 160. The scheduler agent 160 may facilitate communications between nodes. For example, the scheduler 104 in the master node may communicate with the scheduler agent 160. The scheduler agent 160 may then communicate with the storage driver 160 to perform an operation such as initiating an application container instance or unmounting a virtual volume.

In some implementations, the disks 142, 144, 146, and 148 may be accessible to the container nodes via a network. For example, the disks may be located in storage arrays containing potentially many different disks. In such a configuration, which is common in cloud storage environments, each disk may be accessible for potentially many nodes to access. A storage pool such as the pool 140 may include potentially many different disks.

According to various embodiments, the virtual storage volumes 130, 132, and 134 are logical storage units accessible to the distributed storage system. Each virtual storage volume may be implemented on a single disk or may span potentially many different physical disks. At the same time, data from potentially many different virtual volumes may be stored on a single disk. In this way, a virtual storage volume may be created that is potentially much larger than any available physical disk. At the same time, a virtual storage volume may be created in such a way as to be robust to the failure of any individual physical disk. Further, the virtual storage volume may be created in such a way as to allow rapid and simultaneous read access by different nodes. Thus, a single virtual storage volume may support the operation of containerized applications implemented in a distributed fashion across potentially many different nodes.

In some embodiments, a virtual storage volume may need to be mounted at a mount point within the virtual file system in order to be accessed by a container application. A mount point is a type of special directory within the virtual file system that links data read and write requests received from a container application to a storage location. The mount point thereby acts as an interface, allowing the container application to direct storage requests to a fixed location while allowing the actual storage location executing the requests to be changed by mounting a volume to the mount point.

In the system configuration shown in FIG. 1, the Virtual Volume A 130 is attached to the Node A 110 but is not mounted onto a mount path. The Virtual Volume B 132 is attached to the Node A 110 and mounted onto the Mount Path A2 162. The Virtual Volume N 134 is attached to the Node N 114 and mounted onto the Mount Path N2 168. The Mount Paths A1 160, B1 164, and N1 166 have been created but do not have devices mounted onto them.

In particular embodiments, a virtual storage volume may be managed by the same entity that controls the scheduler agent 160. Alternately, a virtual storage volume may be created and managed by an external provider. For example, a containerized application other than the scheduler agent 160 may create and manage a storage volume.

Each compute node may create and/or delete one or more mount paths.

Mounting is a process by which the operating system makes files and directories on a storage volume available for user to access via the computer's file system. In general, the process of mounting involves the first operating system acquiring access to the storage volume, then recognizing, reading, processing file system structure and metadata on it, and finally registering them to the virtual file system (VFS) component. The location in the VFS that the newly-mounted medium at which the storage volume is called a mount point or a mount path. When the mounting process is completed, files and directories on the storage volume are accessible from the mount path.

According to various embodiments, each node may be configured to implement one or more instances of one or more containerized storage applications. For example, the node A 110 includes application instances corresponding with application containers App1 118 and App2 120, while the node B 112 includes application instances corresponding with application containers App1 122 and App4 124. In some configurations, more than one instance of an application container may be implemented at once. For example, the Node N 114 includes an instance of the application container App1 118 as well as App5 126.

In particular embodiments, an application container may correspond to any of a wide variety of containerized applications. For example, as discussed with respect to FIG. 2, a containerized application may be a web server 210, an email server 212, a web application 214, a database, or any of many other types of applications.

In some embodiments, the master node 102 is configured to manage the operations of the clustered storage system. For example, the scheduler 104 at the master node 102 may be configured to receive a request to mount a virtual volume for use at a particular node. The scheduler 104 may then communicate with that node to provide instructions to mount the virtual volume.

Figure 2:
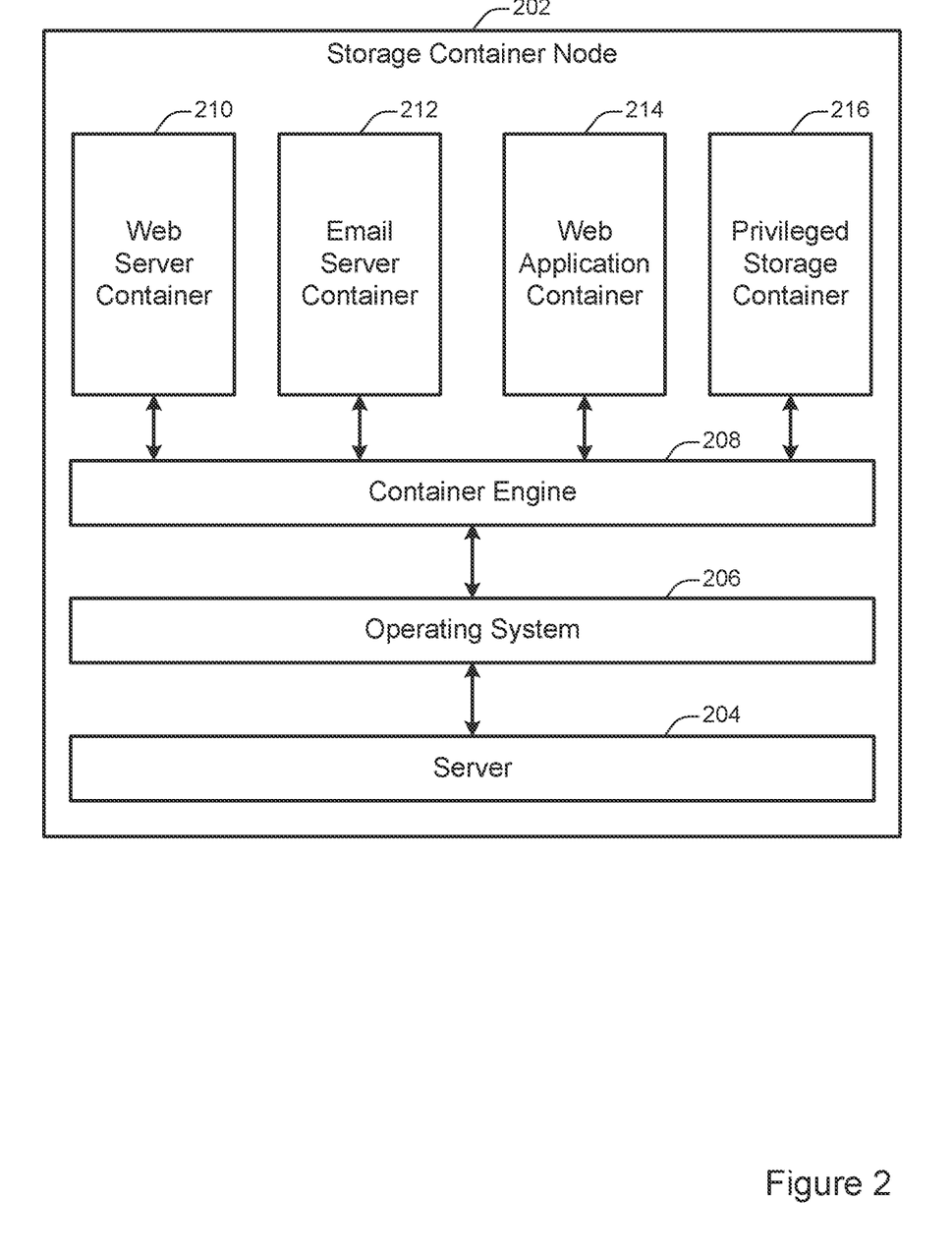
FIG. 2 illustrates an example of a storage container node, configured in accordance with one or more embodiments.

FIG. 2 illustrates an example of a storage container node 202. According to various embodiments, a storage container node may be a server configured to include a container engine and a privileged storage container. The storage container node 202 shown in FIG. 2 includes a server layer 204, an operating system layer 206, a container engine 208, a web server container 210, an email server container 212, a web application container 214, and a privileged storage container 216.

In some embodiments, the storage container node 202 may serve as an interface between storage resources available at a server instance and one or more virtual storage volumes that span more than one physical and/or virtual server. For example, the storage container node 202 may be implemented on a server that has access to a storage device. At the same time, a different storage container node may be implemented on a different server that has access to a different storage device. The two storage nodes may communicate to aggregate the physical capacity of the different storage devices into a single virtual storage volume. The single virtual storage volume may then be accessed and addressed as a unit by applications running on the two storage nodes or at on another system.

In some embodiments, the storage container node 202 may serve as an interface between storage resources available at a server instance and one or more virtual storage volumes that are replicated across more than one physical and/or virtual server. For example, the storage container node 202 may be implemented on a server that has access to a storage volume implemented on one or more storage devices. At the same time, a different storage container node may be implemented on a different server that has access to the same storage volume. The two storage nodes may then each access data stored on the same storage volume. Additional details regarding the configuration of multiple storage container nodes in the same system are discussed with respect to FIG. 3.

At 204, the server layer is shown. According to various embodiments, the server layer may function as an interface by which the operating system 206 interacts with the server on which the storage container node 202 is implemented. A storage container node may be implemented on a virtual or physical server. For example, the storage container node 202 may be implemented at least in part on the server shown in FIG. 5. The server may include hardware such as networking components, memory, physical storage devices, and other such infrastructure. The operating system layer 206 may communicate with these devices through a standardized interface provided by the server layer 204.

At 206, the operating system layer is shown. According to various embodiments, different computing environments may employ different operating system layers. For instance, a physical or virtual server environment may include an operating system based on Microsoft Windows, Linux, or Apple's OS X. The operating system layer 206 may provide, among other functionality, a standardized interface for communicating with the server layer 204.

At 208, a container engine layer is shown. According to various embodiments, the container layer may provide a common set of interfaces for implementing container applications. For example, the container layer may provide application programming interfaces (APIs) for tasks related to storage, networking, resource management, or other such computing tasks. The container layer may abstract these computing tasks from the operating system. A container engine may also be referred to as a hypervisor, a virtualization layer, or an operating-system-virtualization layer.

In some implementations, the separation of the computing environment into a server layer 204, an operating system layer 206, and a container engine layer 208 may facilitate greater interoperability between software applications and greater flexibility in configuring computing environments. For example, the same software container may be used in different computing environments, such as computing environments configured with different operating systems on different physical or virtual servers.

At storage container node may include one or more software containers. For example, the storage container node 202 includes the web server container 220, the email server container 212, and the web application container 214. A software container may include customized computer code configured to perform any of various tasks. For instance, the web server container 220 may provide files such as webpages to client machines upon request. The email server 212 may handle the receipt and transmission of emails as well as requests by client devices to access those emails. The web application container 214 may be configured to execute any type of web application, such as an instant messaging service, an online auction, a wiki, or a webmail service. Although that storage container node 202 shown in FIG. 2 includes three software containers, other storage container nodes may include various numbers and types of software containers.

At 216, a privileged storage container is shown. According to various embodiments, the privileged storage container may be configured to facilitate communications with other storage container nodes to provide one or more virtual storage volumes. A virtual storage volume may serve as a resource for storing or retrieving data. The virtual storage volume may be accessed by any of the software containers 210, 212, and 214 or other software containers located in different computing environments. For example, a software container may transmit a storage request to the container engine 208 via a standardized interface. The container engine 208 may transmit the storage request to the privileged storage container 216. The privileged storage container 216 may then communicate with privileged storage containers located on other storage container nodes and/or may communicate with hardware resources located at the storage container node 202 to execute the request. In some configurations, a privileged storage container is referred to herein as a scheduler agent.

In some implementations, one or more software containers may be afforded limited permissions in the computing environment in which they are located. For example, in order to facilitate a containerized software environment, the software containers 210, 212, and 214 may be restricted to communicating directly only with the container engine 208 via a standardized interface. The container engine 208 may then be responsible for relaying communications as necessary to other software containers and/or the operating system layer 206.

In some implementations, the privileged storage container 216 may be afforded additional privileges beyond those afforded to ordinary software containers. For example, the privileged storage container 216 may be allowed to communicate directly with the operating system layer 206, the server layer 204, and/or one or more physical hardware components such as physical storage devices. Providing the storage container 216 with expanded privileges may facilitate efficient storage operations such as storing, retrieving, and indexing data.

FIG. 3 illustrates an example of a method 300 for mounting a storage volume, performed in accordance with one or more embodiments. The method 300 may be performed at a storage driver located at a compute node, such as the storage driver 116 shown in FIG. 1. The method 300 may be performed in order to render the storage volume accessible to one or more containerized applications at the compute node for reading and/or writing, while avoiding cross-node race conditions.

At 302, a message is received from the container scheduler requesting that a storage volume be mounted at a designated mount path for access by a containerized application. For example, the message may be received from the scheduler 104 at the master node 104. According to various embodiments, the message may be generated as part of a procedure to initiate a containerized application on the compute node. Alternately, the message may be generated to provide access to the virtual storage volume for a containerized application that is already running.

At 304, the designated mount path is created. In some embodiments, the designated mount path may be created by issuing a file system instruction to create a directory. The specific file system instruction issued may depend on the computing environment in which the containerized storage system is implemented. For example, in the Linux file system, a "mkdir" instruction may be issued.

At 306, the designated mount path is marked as read-only. According to various embodiments, the designated mount path may be marked as read-only in order to avoid writing data to a local storage drive in the event that the virtual storage volume is not successfully mounted to the mount point. The mount path may be marked as read-only by issuing a suitable file system instruction. The specific file system instruction issued may depend on the computing environment in which the containerized storage system is implemented. For example, in the Linux file system, a "chattr+i" or an appropriate "chmod" instruction may be issued.

At 308, a mount instruction is issued to mount the virtual storage volume into the designated mount path. In some embodiments, the virtual storage volume may be mounted by issuing a suitable file system instruction. The specific file system instruction issued may depend on the computing environment in which the containerized storage system is implemented. For example, in the Linux file system, a "mount" instruction may be issued.

According to various embodiments, whether the mount instruction succeeds may depend at least in part on the occurrence of a potential race condition. For instance, it is possible that before the virtual storage system is successfully mounted, the compute node received a request to detach the virtual storage volume from the compute node. Such a request may have been received, for instance, from a different compute node. Such a request may be granted so long as the virtual storage volume is not yet mounted.

For example, in the system configuration shown in FIG. 1, the Node A 112 may first receive a request to mount the Virtual Volume A 130 to the Mount Path A1 160. However, before Node A can successfully implement this request, it may receive a request from Node B 112 to detach the Virtual Volume A 130 from Node A for use on Node B. Because the Virtual Volume A 130 is not yet mounted at the time the request is received, the request may be granted. After the Virtual Volume A 130 is detached from the Node A, the instruction to mount the Virtual Volume A 130 will fail. At this time, the Mount Path A1 will still be marked as read-only, so write requests sent to the Mount Path A1 will fail.

In some embodiments, the successful implementation of a mount instruction will result in the designated mount path being automatically marked as writable, even if it has previously been marked as read-only. Thus, after operation 308, the mount path will be automatically marked as writable if and only if the mount instruction succeeds.

At 310, a request is received to write data at the designated mount path. In particular embodiments, the request may be received at the virtual file system itself. For instance, after the virtual storage volume is mounted, then the virtual file system may be responsible for receiving a data write request identifying a mount point from containerized applications and transmitting the write requests to the storage resource mounted at the mount point.

At 312, a determination is made as to whether the designated mount path is marked as writable. According to various embodiments, the determination may be made by the virtual file system. As discussed with respect to operation 308, the designated mount path is automatically marked as writable upon a successful mount operation.

If the designated mount path is not marked as writable, then a write failure message is transmitted at 314. According to various embodiments, the write failure message may indicate that the write request has failed because the mount path is marked as read only. By marking the mount path as read-only and causing the write request to fail, the system avoids inadvertently and incorrectly writing data to a local storage location associated with the virtual file system.

In particular embodiments, the determination made at operation 312 may be made based at least in part based on the detection of an IO error returned by the file system. For example, an attempt to write to a path marked as read only may result in the file system returning an IO error indicating that the write request violates file system permissions.

At 316, if instead the designated mount path is marked as writable, then the data is written to the virtual storage volume. Next, at 316 a write success message is transmitted. According to various embodiments, the write success message may indicate that the data has been written successfully.

FIG. 4 illustrates an example of a method 400 for unmounting a storage volume, performed in accordance with one or more embodiments. According to various embodiments, the method 400 may be performed at a storage driver, such as the storage driver 116 shown in FIG. 1 or the privileged storage container 216 shown in FIG. 2.

In some embodiments, the method 400 may be performed in order to disconnect the storage driver from a particular compute node and/or containerized application. Situations in which such an unmounting may include, but are not limited to: the containerized application is being terminated, the compute node is shutting down, a particular compute task has terminated, the storage volume is being deleted, and/or the storage volume is being shifted to a different compute node.

At 402, a message is received from the container scheduler requesting that a storage volume be unmounted. For example, the message may be received at the storage driver 116 from the scheduler 104 shown in FIG. 1. The message may include, for instance, an identifier associated with the storage volume.

At 404, the storage volume is unmounted. According to various embodiments, the storage volume may be unmounted by issuing any suitable command or commands. For example, in a Linux-based computing environment, a command such as "umount" may be used. When the storage volume is unmounted, the operating system cuts off access to files and directories on the storage volume from the containerized application. As part of this process, any write requests remaining in the queue from the containerized application are executed. File system metadata is refreshed, and the virtual file system relinquishes access to the storage volume. Upon unmounting, the storage volume is made available for detaching from the compute volume.

At 406, the designated mount path is marked as writable. In some embodiments, the designated mount path may be marked as writable. The designated mount path may be marked as writable using any suitable command or comands. For example, in a Linux-based computing environment, a command such as "chattr" or "chmod" may be used.

At 408, the designated mount path is deleted. According to various embodiments, deleting the designated mount path may involve issuing one or more appropriate file system commands. For example, in a Linux-based computing environment, a command such as "rm" may be employed.

In particular embodiments, marking the designated write path as deleted may be preceded by a time delay. Such a delay may help to avoid a problem whereby the container engine creates a writeable path if one does not exist. The delay may be of any suitable time length, such as between one second and one minute.

At 410, a response message is transmitted to the container scheduler. According to various embodiments, the response message may indicate that the storage volume has been successfully unmounted from the compute node.

According to various embodiments, some or all of the operations performed in FIGS. 3 and 4 may be performed in parallel. For example. multiple data write requests may be received and/or executed in parallel. As another example, the mount path may be created and marked as read-only in parallel with the execution of the instruction to mount the virtual storage volume into the designated mount path.

FIG. 5 illustrates one example of a server. According to particular embodiments, a system 500 suitable for implementing particular embodiments of the present invention includes a processor 501, a memory 503, an interface 511, and a bus 515 (e.g., a PCI bus or other interconnection fabric) and operates as a container node. When acting under the control of appropriate software or firmware, the processor 501 is responsible for implementing applications such as an operating system kernel, a containerized storage driver, and one or more applications. Various specially configured devices can also be used in place of a processor 501 or in addition to processor 501. The interface 511 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 500 is a server configured to run a container engine. For example, the system 500 may be configured as a storage container node as shown in FIG. 1 and FIG. 2. The server may include one or more hardware elements as shown in FIG. 5. In some implementations, one or more of the server components may be virtualized. For example, a physical server may be configured in a localized or cloud environment. The physical server may implement one or more virtual server environments in which the container engine is executed. Although a particular server is described, it should be recognized that a variety of alternative configurations are possible. For example, the modules may be implemented on another device connected to the server.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method comprising:
   determining, by at least one computing device, whether a virtual storage volume is successfully mounted to a mount path associated with a compute node, wherein the mount path is an interface directory to which the virtual storage volume is mounted to be attached to the compute node, the mount path being marked as read-only before an instruction to mount the virtual volume to the mount path is issued, the marking the mount path as read-only configured to avoid a situation where data that is meant to be written to the virtual storage volume is written elsewhere because the virtual storage volume has already been detached from the compute node before the virtual storage volume has been successfully mounted at the mount path;
   marking, if the determining includes determining that the virtual storage volume is successfully mounted to the mount path, the mount path as writable; and maintaining, if the determining includes determining that the virtual storage volume is unsuccessfully mounted to the mount path, the mount path as read-only.

2. The method of claim 1, further comprising:
writing, based on a determination that the mount path is marked as writable, data associated with a write request to the virtual storage volume, the write request received from a containerized application and associated with the mount path.

3. The method of claim 1, further comprising:
rejecting, based on a determination that the mount path is marked as read-only, a write request received from a containerized application and associated with the mount path.

4. The method of claim 1, further comprising:
determining that the mount path is marked as read-only by receiving, in response to a write attempt to the mount path, an IO error indicating that the write attempt violates a system permission.

5. The method of claim 1, wherein:
the mount path is a directory within a virtual file system and configured to link a data request associated with a containerized application to a storage location.

6. The method of claim 1, wherein:
a mounting request to mount the virtual storage volume to the mount path is received from a master node;
a detach request to detach the virtual storage volume from the compute node is received from a different compute node prior to the virtual storage volume being mounted to the mount path, the virtual storage volume being detached from the compute node based on the detach request; and
the determining whether the virtual storage volume is successfully mounted to the mount path includes determining, based on the detaching of the virtual storage volume from the compute node, that the virtual storage volume is unsuccessfully mounted to the mount path.

7. The method of claim 1, wherein:
the mount path is marked as read-only or writable using a chattr command or a chmod command.

8. The method of claim 1, further comprising:
deleting the mount path subsequent to unmounting the virtual storage volume from the mount path and marking the virtual storage volume as writable.

9. The method of claim 8, further comprising:
marking the mount path as deleted after a time delay.

10. A system comprising:
a memory storing instructions; and
a processor communicatively coupled to the memory and configured to execute the instructions to:
determine whether a virtual storage volume is successfully mounted to a mount path associated with a compute node, wherein the mount path is an interface directory to which the virtual storage volume is mounted to be attached to the compute node, the mount path being marked as read-only before an instruction to mount the virtual volume to the mount path is issued, the marking the mount path as read-only configured to avoid a situation where data that is meant to be written to the virtual storage volume is written elsewhere because the virtual storage volume has already been detached from the compute node before the virtual storage volume has been successfully mounted at the mount path;
mark, if the determining includes determining that the virtual storage volume is successfully mounted to the mount path, the mount path as writable; and
maintain, if the determining includes determining that the virtual storage volume is unsuccessfully mounted to the mount path, the mount path as read-only.

11. The system of claim 10, wherein the processor is further configured to:
write, based on a determination that the mount path is marked as writable, data associated with a write request to the virtual storage volume, the write request received from a containerized application and associated with the mount path.

12. The system of claim 10, wherein the processor is further configured to:
reject, based on a determination that the mount path is marked as read-only, a write request received from a containerized application and associated with the mount path.

13. The system of claim 10, wherein the processor is further configured to:
determine that the mount path is marked as read-only by receiving, in response to a write attempt to the mount path, an IO error indicating that the write attempt violates a system permission.

14. The system of claim 10, wherein:
the mount path is a directory within a virtual file system and configured to link a data request associated with a containerized application to a storage location.

15. The system of claim 10, wherein:
a mounting request to mount the virtual storage volume to the mount path is received from a master node;
a detach request to detach the virtual storage volume from the compute node is received from a different compute node prior to the virtual storage volume being mounted to the mount path, the virtual storage volume being detached from the compute node based on the detach request; and
the determining whether the virtual storage volume is successfully mounted to the mount path includes determining, based on the detaching of the virtual storage volume from the compute node, that the virtual storage volume is unsuccessfully mounted to the mount path.

16. The system of claim 10, wherein:
the mount path is marked as read-only or writable using a chattr command or a chmod command.

17. The system of claim 10, wherein the processor is further configured to:
delete the mount path subsequent to unmounting the virtual storage volume from the mount path and marking the virtual storage volume as writable.

18. The system of claim 17, wherein the processor is further configured to:
mark the mount path as deleted after a time delay.

19. A non-transitory computer-readable medium storing instructions that, when executed, direct a processor of a computing device to:
determine whether a virtual storage volume is successfully mounted to a mount path associated with a compute node, wherein the mount path is an interface directory to which the virtual storage volume is mounted to be attached to the compute node, the mount path being marked as read-only before an instruction to mount the virtual volume to the mount path is issued, the marking the mount path as read-only configured to avoid a situation where data that is meant to be written to the virtual storage volume is written elsewhere because the virtual storage volume has already been detached from the compute node before the virtual storage volume has been successfully mounted at the mount path;

mark if the determining includes determining that the virtual storage volume is successfully mounted to the mount path, the mount path as writable; and maintain, if the determining includes determining that the virtual storage volume is unsuccessfully mounted to the mount path, the mount path as read-only.

20. The non-transitory computer-readable medium of claim 19, wherein the instructions further direct the processor to:

write, based on a determination that the mount path is marked as writable, data associated with a write request to the virtual storage volume, the write request received from a containerized application and associated with the mount path.

* * * * *